United States Patent
Fukusaka et al.

(10) Patent No.: US 6,333,609 B1
(45) Date of Patent: Dec. 25, 2001

(54) DRIVE CONTROL DEVICE OF VIBRATION TYPE MOTOR

(75) Inventors: Tetsuro Fukusaka, Susono; Toshihiko Otsubo, Numazu; Michio Kawase, Mishima; Kazuyoshi Suzuki, Numazu; Takahiro Watanabe, Shizuoka-ken; Jun Yamaguchi, Numazu, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,969

(22) Filed: Jul. 28, 1999

(30) Foreign Application Priority Data

Jul. 30, 1998 (JP) .................................................. 10-215895

(51) Int. Cl.$^7$ .................................................. H02K 33/00
(52) U.S. Cl. .......................... 318/114; 318/128; 318/116; 310/316.01
(58) Field of Search ................... 318/66, 68, 69, 318/70, 71, 72, 73, 74, 75, 114, 119, 126, 127, 128, 135, 686, 129, 130, 116; 310/316.01, 316.02, 316.03

(56) References Cited

U.S. PATENT DOCUMENTS

| | | | |
|---|---|---|---|
| 4,951,168 | * | 8/1990 | Harrison ........................... 336/144 X |
| 5,739,724 | * | 4/1998 | Alexandre et al. .............. 310/316 X |
| 6,049,156 | * | 4/2000 | Yamamoto et al. ............ 310/316.01 |
| 6,114,818 | * | 9/2000 | Ohtsubo et al. ....................... 318/49 |

* cited by examiner

Primary Examiner—Nestor Ramirez
Assistant Examiner—Judson H. Jones
(74) Attorney, Agent, or Firm—Fitzpatrick, Cella, Harper & Scinto

(57) ABSTRACT

A vibration control device of a vibration type motor stops motor driving when the actual driving speed, does not come close to a target speed though the frequency of a driving periodic signal is feedback-controlled to the target speed, to prevent an error when the driving circuit fails.

16 Claims, 6 Drawing Sheets

DRIVE CONTROL DEVICE OF VIBRATION TYPE MOTOR

BACKGROUND OF THE INVENTION

1. Field of the Invention

The present invention relates to a drive control device of a vibration type motor, a device having the vibration type motor, and an image forming apparatus such as an electrophotographic printer, copying machine, or facsimile apparatus.

2. Related Background Art

Conventionally, a vibration type motor uses a vibration member. This vibration member is formed by adhering, with an adhesive, piezoelectric elements serving as electromechanical energy conversion elements to one surface of, e.g., a metal ring-like elastic member. Two standing waves are excited on the elastic member by applying alternative voltages having different phases to a driving piezoelectric element group formed on the piezoelectric elements, and generate a travelling vibration wave as a bending vibration by synthesizing these standing waves.

A member in, e.g., a ring shape, is pressed against the other surface of the elastic member via a press means, such as a spring. This member and an elastic member relatively move by frictional driving by the travelling vibration wave generated on the elastic member.

A the driving control device for controlling drive of the vibration type motor comprises a driving pulse generator for generating a driving pulse, and an alternative voltage generator, including a transformer, for generating alternative voltages having different phases applied to the piezoelectric element group in accordance with the driving pulse.

Since the vibration type motor has a high rotational precision and high resistance to transient load variations, a device using this vibration type motor as a driving source is advantageous in terms of color misregistration, pitch irregularity, paper feed shock, and the like. Thus, this device is proposed to be used as a driving device for a photosensitive drum of each color in an electrophotography color image forming apparatus, and a driving device for a driving roller for driving an endless transfer member convey belt, which sequentially conveys a transfer member to the transfer position of the photosensitive drum of each color.

SUMMARY OF THE INVENTION

It is an object of the present invention to provide a drive control device of a vibration type motor, capable of detecting that the transformer of the drive control device becomes unusual, and preventing the influence of the unusual transformer on the vibration type motor or a driving circuit, a device having the vibration type motor, and an image forming apparatus.

One aspect of the application is to provide a drive control device of a vibration type motor in which a periodic voltage is applied to an electro-mechanical energy conversion element to vibrate a vibration member, thereby obtaining a driving force, comprising a monitor circuit for monitoring information about the rotational speed of the vibration type motor, a frequency control circuit for comparing information about the rotational speed monitored by the monitor circuit with information about a target speed, and increasing/decreasing a driving frequency in order to shift the speed of the motor to the target speed, a driving circuit for generating a periodic voltage having a frequency corresponding to the frequency controlled by the control circuit, and a stop circuit for placing the driving circuit in an inoperative state when the difference between the target speed and the speed of the motor is not reduced even by increasing/decreasing the frequency by the control circuit.

One aspect of the application is to provide a drive control device of a vibration type motor in which a periodic voltage is applied to an electro-mechanical energy conversion element to vibrate a vibration member, thereby obtaining a driving force, comprising a transformer circuit including a transformer for generating the periodic voltage as an output from a secondary side, a determination circuit for determining whether the transformer becomes unusual, and a stop circuit for stopping driving of the motor when the determination circuit determines that the transformer becomes unusual.

One aspect of the application is to provide a drive control device of a vibration type motor in which a periodic voltage is applied to an electro-mechanical energy conversion element to vibrate a vibration member, thereby obtaining a driving force, comprising an encoder connected to the vibration type motor, a feedback control system, the control system having a first comparator for comparing an output from the encoder with target speed data, and a feedback circuit for increasing/decreasing a driving frequency in accordance with an output from the comparator in order to shift the speed of the motor to the target speed, a driving circuit connected to the feedback control system to generate a periodic voltage having a frequency corresponding to the frequency determined by feedback control system, a second comparator for comparing the frequency determined by the feedback system with a limit value, and when the frequency reaches the limit value, outputting a signal representing that the frequency has reached the limit value, and a stop circuit connected to the second comparator to place the driving circuit in an inoperative state.

One aspect of the application is to provide a printer apparatus having the above drive control device.

The above and other objects, features, and advantages of the present invention will be apparent from the following description in conjunction with the accompanying drawings.

DETAILED DESCRIPTION OF THE PREFERRED EMBODIMENT

An embodiment of the present invention will be described in detail below with reference to FIGS. 1 to 4.

Figure 3:
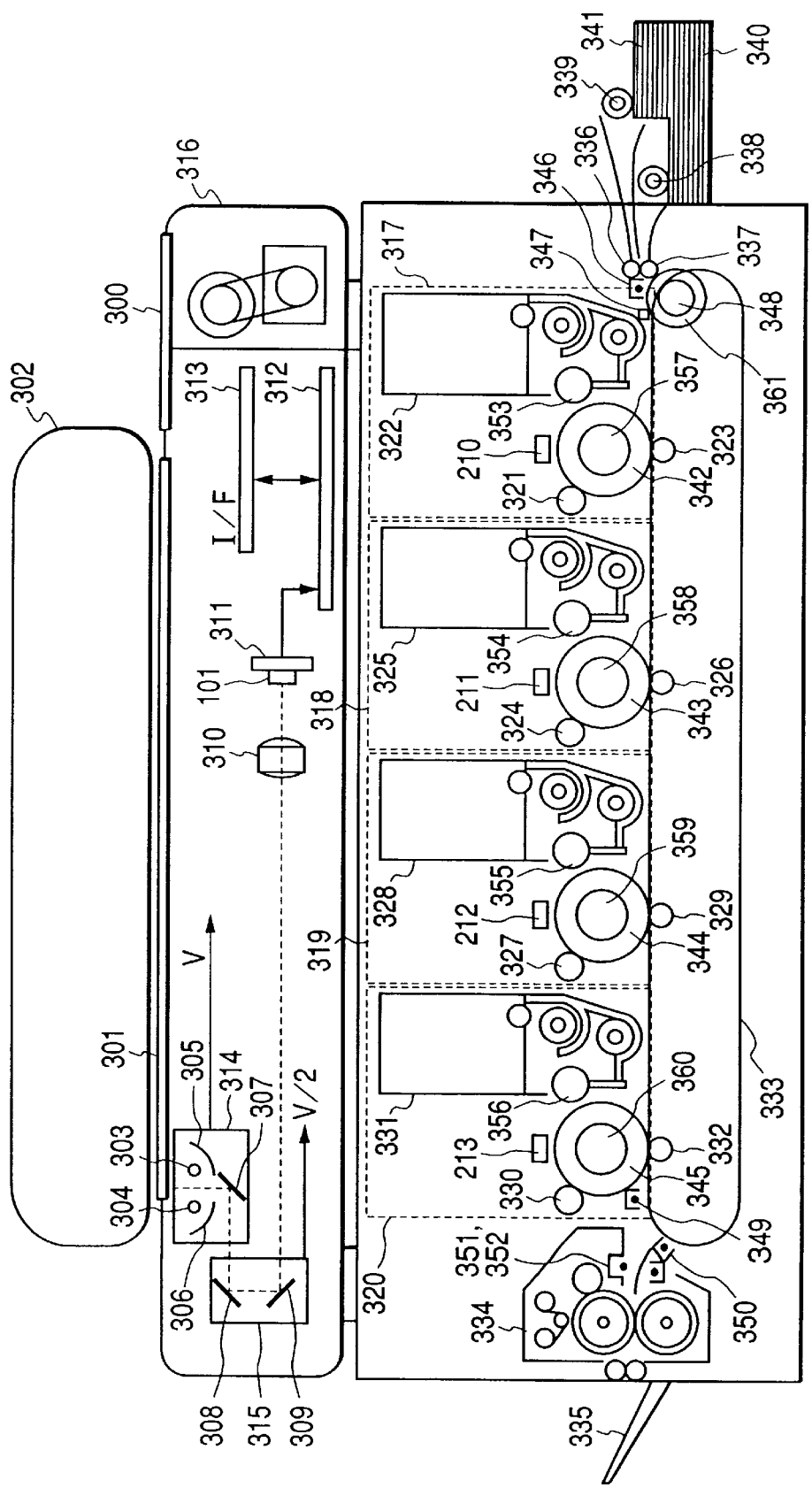
FIG. 3 is a schematic view showing an image forming apparatus according to the embodiment of the present invention.

FIG. 3 is a schematic cross-sectional view showing a digital color copying machine. In FIG. 3, the upper and lower parts of this copying machine are a reader section and printer section, respectively.

The arrangement of the reader section will be described with reference to FIG. 3. The reader section is constituted by a CCD 101, a substrate 311 on which the CCD 101 is mounted, a printer processor 312, a glass original table (platen) 301, an original feeder 302 (in some cases, a mirror-surface press plate (not shown) may replace the original feeder 302), light sources 303 and 304, such as halogen lamps or fluorescent lamps, for illuminating the original, reflectors 305 and 306 for focusing light from the light sources 303 and 304 onto the original, mirrors 307 to 309, a lens 310 for condensing the reflected or projected light from the original on the CCD 101, a carriage 314 for storing the halogen lamps 303 and 304, reflectors 305 and 306, and mirror 307, a carriage 315 for storing the mirrors 308 and 309, and an interface (I/F) 313 with another component, such as an IPU. The entire surface of the original is scanned (subscanned) by mechanically moving the carriages 314 and 315 in a direction perpendicular to the electrical scanning (main scanning) direction of the CCD 101 at speeds V and V/2, respectively.

The arrangement of the printer section in FIG. 3 will be described. The printer section is constituted by a yellow (Y) image forming unit 317, a magenta (M) image forming unit 318, a cyan (C) image forming unit 319, and a black (K) image forming unit 320. Since these units have the same arrangement, only the Y image forming unit 317 will be explained, and a description of the remaining image forming units will be omitted.

In the Y image forming unit 317, a photosensitive drum 342 serving as an image carrier is driven by a vibration type motor 357 (the remaining photosensitive drums of the image forming unit of another color are also driven by respective vibration type motors). A latent image is formed on the surface of the photosensitive drum 342 by light from an LED array 210. A primary charger 321 charges the surface of the photosensitive drum 342 to a predetermined potential to prepare for formation of the latent image. A developing unit 322 develops the latent image on the photosensitive drum 342 to form a toner image. The developing unit 322 includes a sleeve for applying a developing bias and developing the image.

A transfer charger 323 discharges below a transfer member convey belt 333 and transfers the toner image on the photosensitive drum 342 to a recording sheet or the like on the transfer member convey belt 333. In this embodiment, a cleaner is not arranged because of the high transfer efficiency, but it may be mounted.

A procedure of forming a toner image on a transfer member, such as a recording sheet, will be described. Transfer members, such as recording sheets, stacked in cassettes 340 and 341, are picked up one by one by pickup rollers 339 and 338 and are supplied onto the transfer member convey belt 333 by paper feed rollers 336 and 337. The fed recording sheet is charged by an attraction charger 346. A transfer member convey belt roller 348 drives the transfer member convey belt 333, charges the recording sheet together with the attraction charger 346, and attracts the recording sheet to the transfer member convey belt 333. The transfer member convey belt roller 348 may be replaced by a driving roller for driving the transfer member convey belt 333. Alternatively, the driving roller for driving the transfer member convey belt 333 may be arranged on the opposite side, or near the roller 348.

A leading end sensor 347 detects the leading end of the recording sheet on the transfer member convey belt 333. The detection signal of the leading end sensor 347 is transferred from the printer section to the color reader section, and is used as a subscanning sync signal in transferring a video signal from the color reader section to the printer section.

The recording sheet is conveyed by the transfer member convey belt 333, and toner images are formed on the sheet surface in the order from Y, M, C, and K in the image forming units 317 to 320. The transfer member, such as the recording paper, having passed through the K image forming unit 320, is charge-removed by a charge remover 349 in order to facilitate separation from the transfer member convey belt 333, and then is separated from the transfer member convey belt 333. A separation charger 350 prevents image disturbance by separation discharge in separating the recording sheet from the transfer member convey belt 333. The separated recording sheet is charged by pre-fixing chargers 351 and 352 in order to compensate for the toner adhesion strength and prevent image disturbance, and discharged is to a discharge tray 335 after the toner image is thermally fixed by a fixing unit 334.

Figure 1:
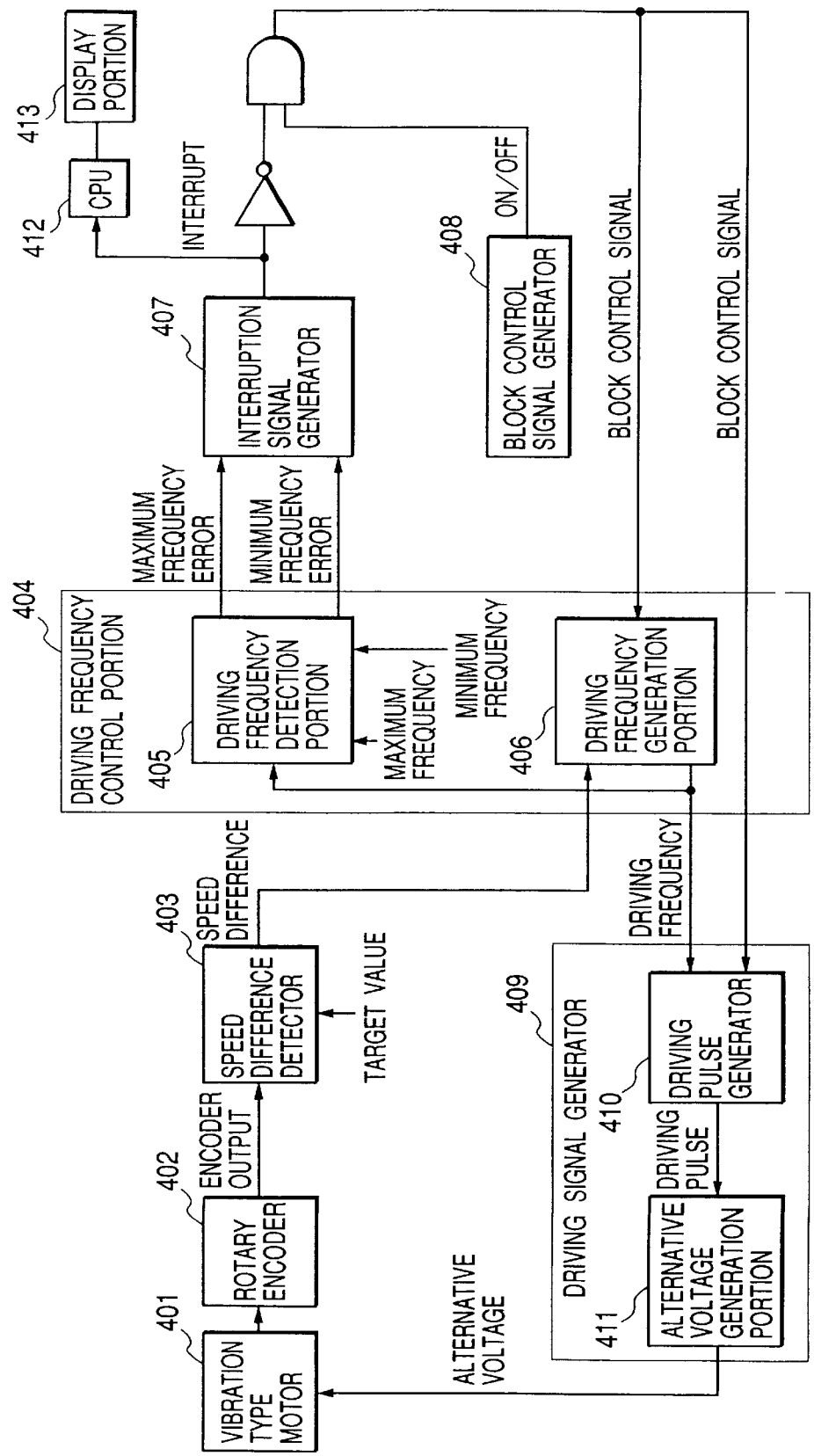
FIG. 1 is a block diagram showing a drive control device of a vibration type motor according to an embodiment of the present invention.

FIG. 1 is a block diagram showing a drive control device of a vibration type motor.

In FIG. 1, a vibration type motor 401 operates as follows. A moving member is pressed against a vibration member formed by adhering piezoelectric elements serving as electro-mechanical energy conversion elements to one surface of a ring-like elastic member. The moving member is coupled to a rotating shaft attached to the rotation center of the moving member, and rotation of the moving member is transferred to the rotating shaft. The front end of the rotating shaft is directly connected to the photosensitive drum or transfer member convey belt roller, whereas the back end is attached to a rotary encoder 402 to obtain speed information by a speed detector (not shown). The speed information as an encoder output, and a target value are input to a speed difference detector 403, which outputs the speed difference. Note that the vibration type motor is not limited to the ring shape, and the vibration member may move with respect to a press contact member.

The speed difference information from the speed difference detector 403 is input to a driving frequency generation portion 406 of a driving frequency control portion 404. If, for example, the current speed has not reached the target speed, the driving frequency generation portion 406 performs the processing of decreasing the driving frequency in order to increase the rotational speed (decreasing the frequency by a predetermined amount to set a new frequency). The driving frequency generation portion 406 inputs (sets) the decreased driving frequency to a driving pulse generator 410 of a driving signal generator 409. In contrast, if the current speed exceeds the target speed, the driving frequency generation portion 406 increases the driving frequency by a predetermined amount. The driving pulse generator 410 outputs a driving pulse having the frequency set by the above processing to an alternative voltage generation portion 411. The alternative voltage generation portion 411 applies alternative voltages having different phases to respective driving piezoelectric element groups among the piezoelectric elements of the vibration type motor so as to shift the driving speed to the target speed.

A driving frequency detection portion 405 monitors the driving frequency serving as an output from the driving frequency generation portion 406, and compares it with maximum and minimum frequencies set in advance. If the driving frequency exceeds the maximum frequency or is lower than the minimum frequency, the driving frequency detection portion 405 outputs a maximum frequency error or minimum frequency error to an interruption signal generator 407.

When receiving the maximum frequency error or minimum frequency error, the interruption signal generator 407 outputs a high-level interruption signal, which is inverted by an inverter. An AND circuit outputs an AND output (block control signal) obtained by ANDing the inverted signal and an output (low level by switch-on or high level by switch-off) from a block control signal generator 408 (for generating a signal which performs an on/off operation each block of a gate array in the control system) to the driving frequency generation portion 406 and driving pulse generator.

When the block control signal changes to a low level, the driving frequency generation portion 406 outputs a predetermined initial frequency (e.g., a frequency at the start of activation) as a driving frequency, and the driving pulse generator 410 outputs low-level driving pulses (changes all outputs to a low level to substantially inhibit output of any pulse). When the block control signal (low level) is output from the AND circuit, the driving frequency generation portion 406 outputs the initial frequency of a fixed value even if it receives speed difference information from the speed difference detector 403. The initial frequency is not one necessary for driving the vibration type motor, so the vibration type motor stops. In addition, since the driving pulse generator 410 outputs only the low-level driving pulse, the alternative voltage generation portion 411 does not generate any voltage, the transformer of the alternative voltage generation portion 411 is not energized, and the transformer in, e.g., a short-circuited state, can be prevented from a temperature rise. Note that in a usual state in which the interruption signal generator 407 outputs a low-level signal and the block control signal generator 408 outputs a high-level signal, the block control signal is at high level, and the driving frequency generation portion 406 increases/decreases the frequency in accordance with the speed difference information. At this time, the driving pulse generator 410 outputs a pulse having a set frequency.

Figure 5:
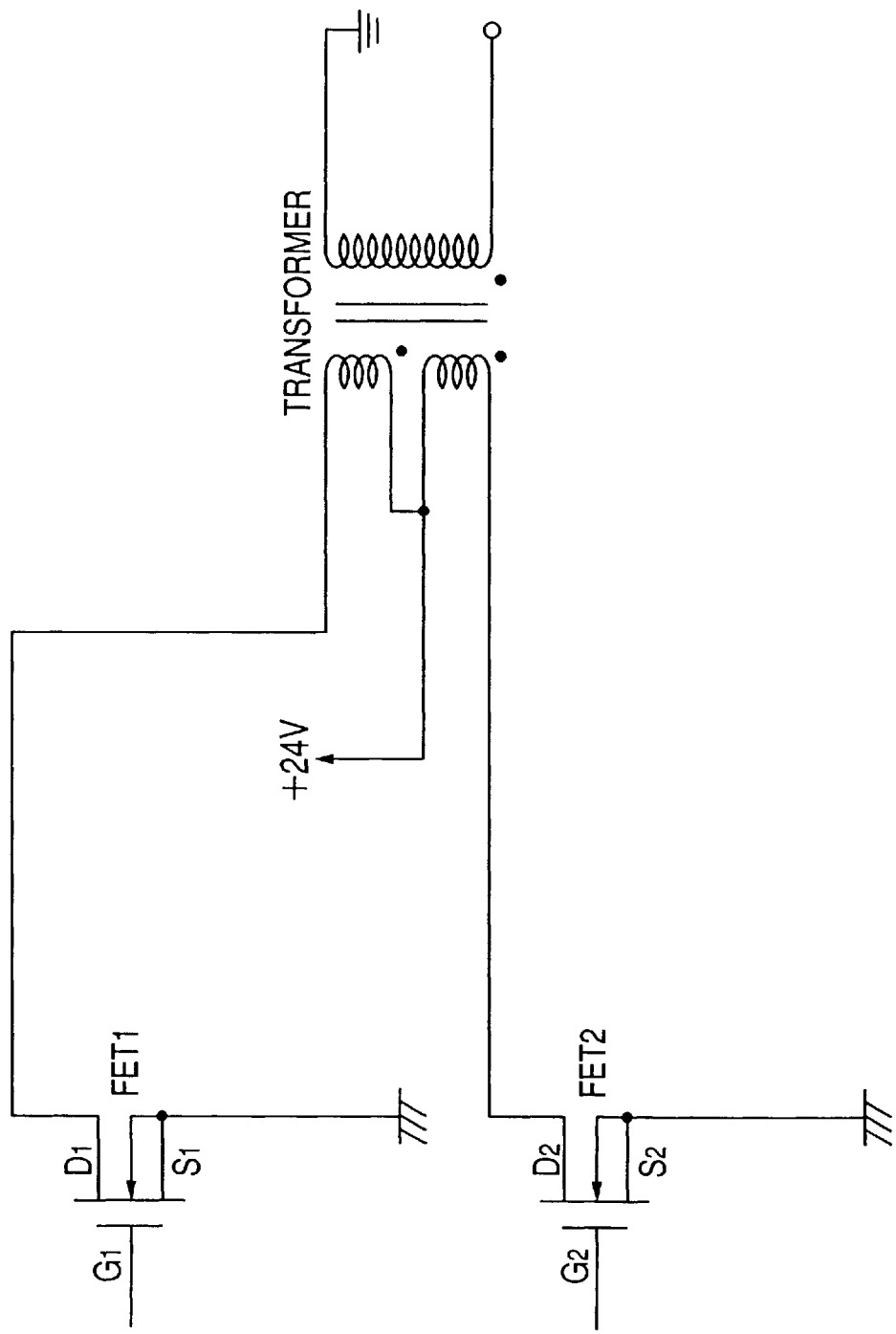
FIG. 5 is a circuit diagram showing a transformer.
Figure 6:
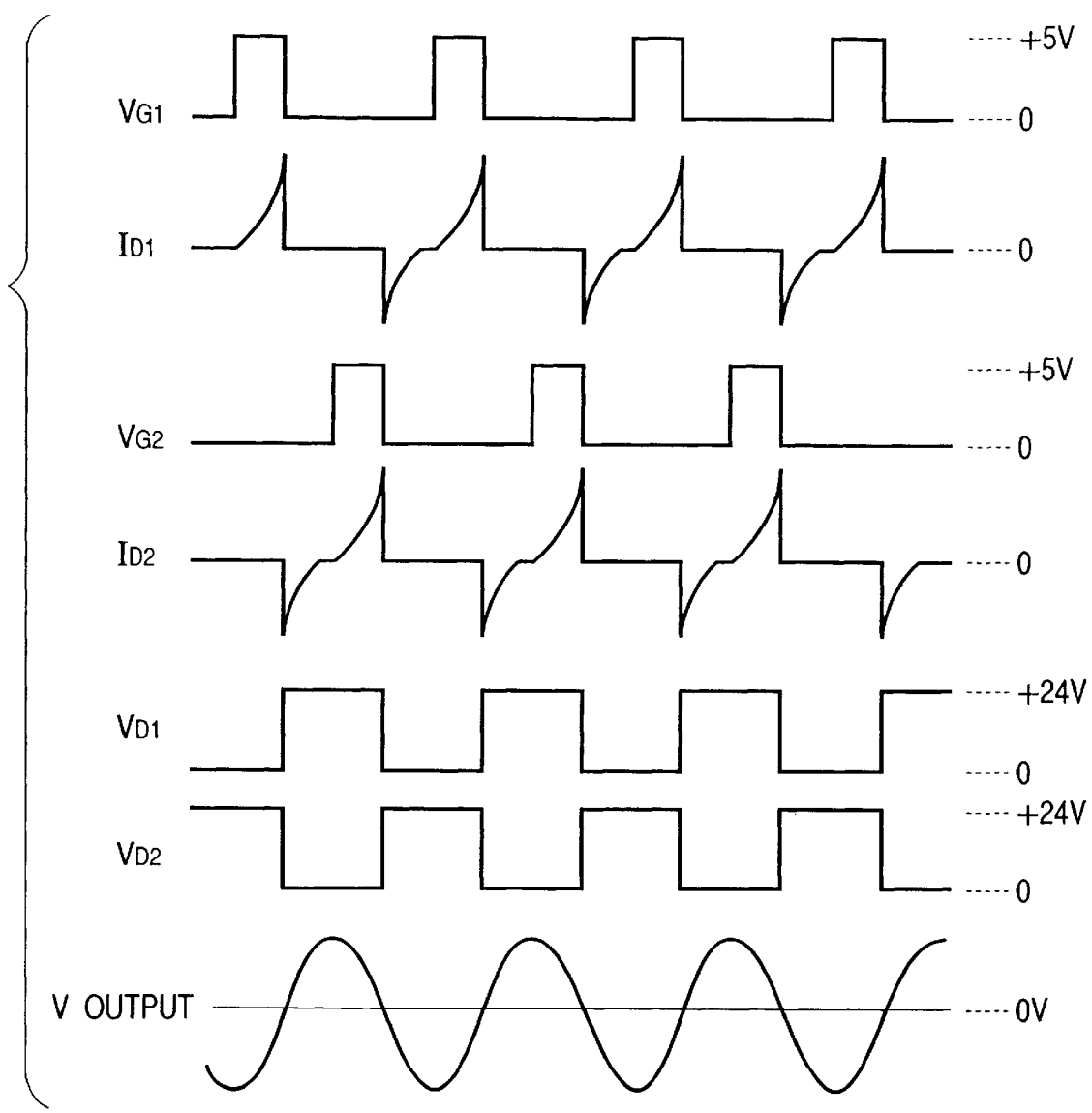
FIG. 6 is a waveform chart showing changes in current and voltage around the transformer and FETs.

FIG. 5 is a circuit diagram showing the alternative voltage generation portion 411, and FIG. 6 is a waveform chart showing changes in current and voltage around the transformer and FETs. Note that FET1 and FET2 receive the driving pulse.

Figure 2:
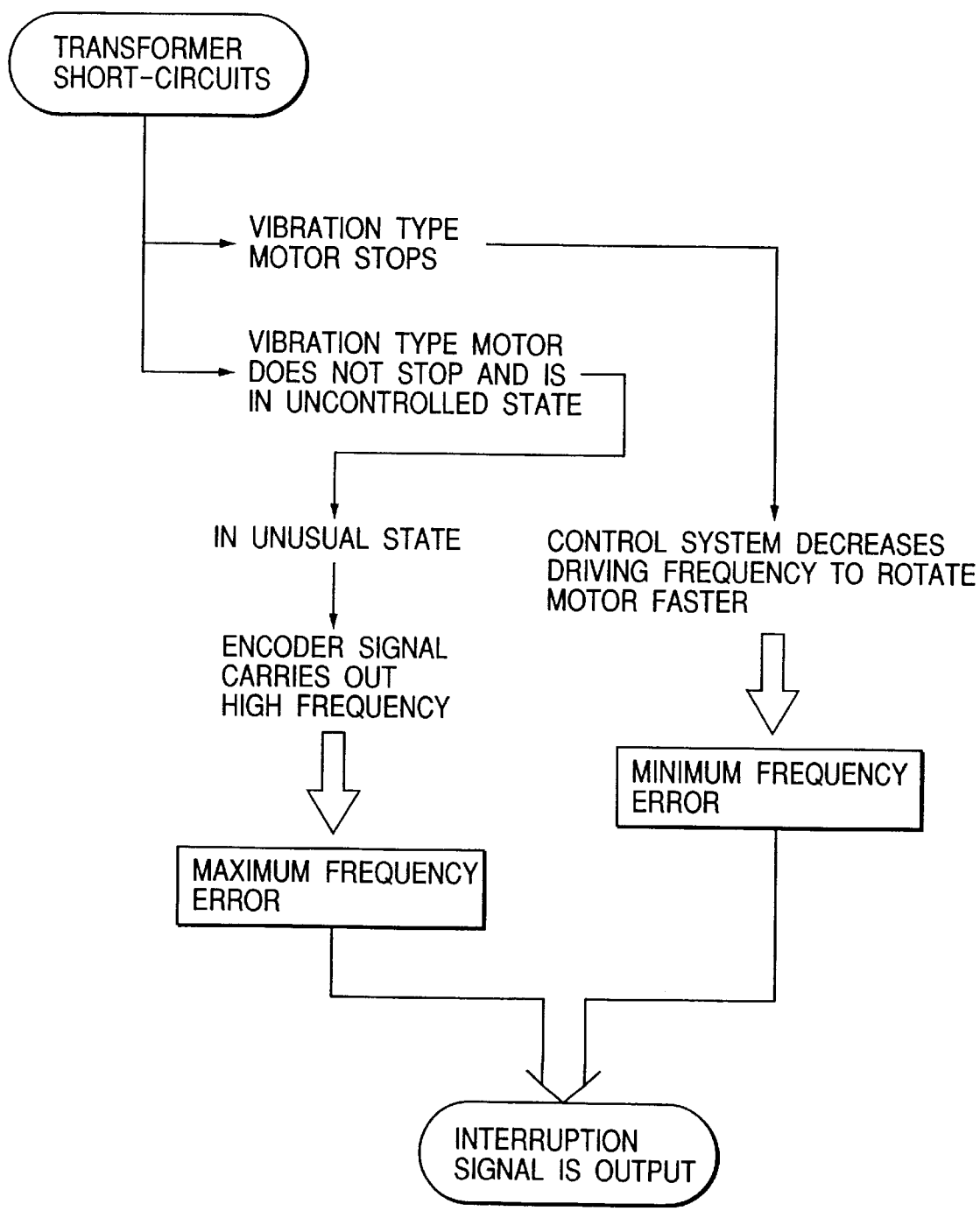
FIG. 2 is a flow chart showing an interruption signal generation operation in FIG. 1.

FIG. 2 shows processing operation of outputting maximum and minimum frequency errors. When the transformer short-circuits, if voltage supply to the vibration type motor stops, the vibration type motor stops; if voltage supply to the vibration type motor becomes unusual, the vibration type motor does not stop and is in an uncontrolled state.

When the vibration type motor suddenly stops due to a short circuit of the transformer, unlike the vibration type motor stop operation of sequentially decreasing the target speed in a usual control state, the motor control system decreases the driving frequency in order to increase the rotational speed of the motor because of a low rotational speed of the motor. Along with this, the speed difference output from the speed difference detector 403 increases. However, since no driving voltage is applied to the vibration type motor, the rotational speed does not increase though the driving frequency is being decreased. This results in a minimum frequency error in which the driving frequency value obtained from the speed difference becomes lower than a predetermined value. Then, the interruption signal generator 407 outputs an interruption signal.

On the other hand, when voltage supply to the vibration type motor assumes an unusual state owing to a short circuit of the transformer, and the vibration type motor does not stop and is in an uncontrolled state, the rotational speed of the vibration type motor unusually increases (repetitively increases and decreases the rotational speed). Since the rotational speed of the motor increases, the motor control system increases the driving frequency in order to decrease the rotational speed of the motor. At this time, the rotational speed repetitively increases and decreases, so that a high frequency is superposed on the encoder output. This results in a maximum frequency error in which the driving frequency value obtained from the speed difference output from the speed difference detector 403 exceeds a predetermined value. Then, the interruption signal generator 407 outputs an interruption signal.

In either case, if the interruption signal is output, the driving pulse changes to a low level (output of the pulse stops), as described above, and FET1 and FET2 in FIG. 5 are turned off to disconnect the energization path to the transformer.

The interruption signal from the interruption signal generator 407 is also input to a CPU 412, which announces information such as the stop of the motor when there is an unusual temperature rise on a display portion 413 by the input interruption signal. In this embodiment, the display portion 413 also serves as a display portion for operation and display of the copying machine main body. Operation of the CPU 412 is shown in a flow chart of FIG. 4.

Figure 4:
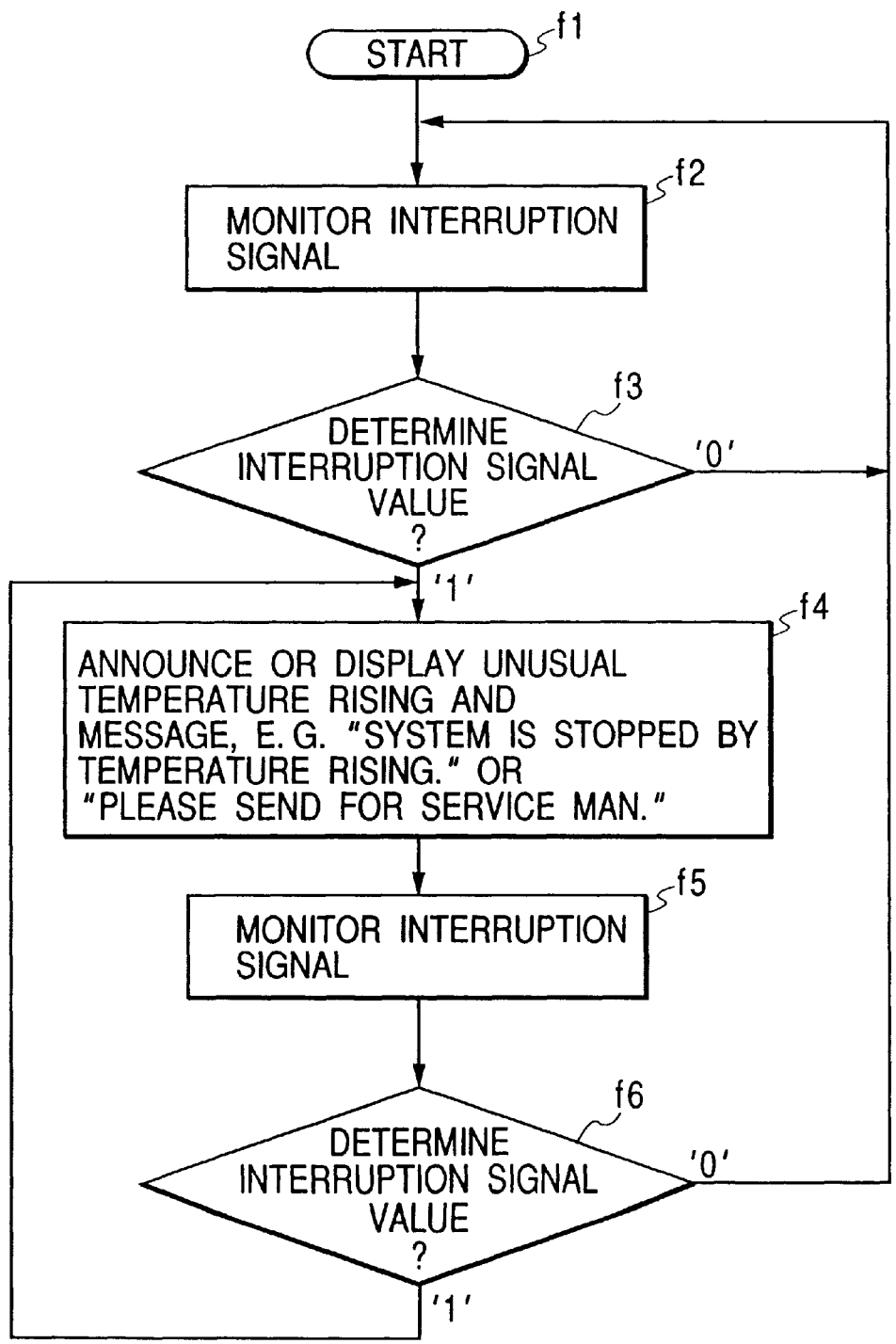
FIG. 4 is a flow chart showing the operation of a CPU in FIG. 1.

In FIG. 4, the CPU 412 starts operating in step f1, monitors an interruption signal as an output from the interruption signal generator 407 in step f2, and determines in step f3 whether the interruption signal value is "1" or "0".

If the interruption signal is "0", i.e., no interruption signal is output, the CPU 412 returns to step f2 to repeat this operation while the interruption signal from the interruption signal generator 407 is "0".

If the interruption signal is determined to be "1" in step f3, the CPU 412 displays an unusual temperature rise and its measure on the liquid crystal display portion 413 in step f4.

The CPU 412 monitors again an interruption signal as an output from the interruption signal generator 407 in step f5, and determines in step f6 whether the interruption signal is "0" or "1". If the interruption signal is "0", the CPU 412 returns to step f2; if the interruption signal is "1", returns to step f4 to perform the above operation.

Note that the present invention is not limited to the digital color image forming apparatus, and can be applied to all image forming apparatuses each of which drives the transfer member convey belt of a photosensitive member by a driving means having a temperature-rising component, such as a transformer, in a driver circuit such as a vibration type motor.

This embodiment generates an error signal by comparing a frequency controlled by the feedback control system with a maximum or minimum frequency. Instead, while the frequency is feedback-controlled, a change in speed difference detected by the circuit 403 may be detected, and it may be determined whether this value is not reduced even upon a predetermined time. When the value is not determined to be reduced, an error signal may be generated.

What is claimed is:

1. A drive control device of a vibration type motor in which a periodic voltage is applied to an electro-mechanical energy conversion element to vibrate a vibration member, thereby obtaining a driving force, comprising:

a monitor circuit which monitors information about the rotational speed of the vibration type motor;

a frequency control circuit which compares the information about the rotational speed monitored by said monitor circuit with information about a target speed, and increases or decreases the driving frequency in order to shift the speed of the motor to the target speed;

a driving circuit which generates a periodic voltage having a frequency corresponding to the frequency controlled by said frequency control circuit; and a stop circuit which places said driving circuit in an inoperative state when a difference between the target speed and the speed of the motor is not reduced even by increasing or decreasing the frequency by said frequency control circuit.

2. A device according to claim 1, further comprising announcement means for, when the difference between the target speed and the speed of the motor is not reduced even by increasing or decreasing the frequency by said frequency control circuit, announcing that the difference between the target speed and the speed of the motor is not reduced even by increasing or decreasing the frequency by said control circuit.

3. A device according to claim 1, wherein said driving circuit comprises a pulse generation circuit which generates a pulse having a frequency corresponding to the frequency controlled by said frequency control circuit, and a transformer circuit which generates the periodic voltage in accordance with the pulse, and wherein said stop circuit stops energizing said transformer circuit.

4. A device according to claim 1, wherein said driving circuit comprises a pulse generation circuit which generates a pulse having a frequency corresponding to the frequency controlled by said frequency control circuit, and a transformer circuit which generates the periodic voltage in accordance with the pulse, and wherein said stop circuit stops the generating of a pulse by said pulse generation circuit.

5. A drive control device of a vibration type motor in which a periodic voltage is applied to an electro-mechanical energy conversion element to vibrate a vibration member, thereby obtaining a driving force, comprising:

a transformer circuit including a transformer which generates the periodic voltage as an output from a secondary side thereof;

a determination circuit which determines whether said transformer circuit becomes unusual; and a stop circuit which stops driving the motor when said determination circuit determines that said transformer circuit becomes unusual, wherein said drive control device further comprises a monitor circuit which monitors information about the rotational speed of the vibration type motor, a frequency control circuit which compares the information about the rotational speed monitored by said monitor circuit with information about a target speed, and increases or decreases a driving frequency in order to shift the speed of the motor to the target speed, and a driving circuit which drives said transformer circuit by a frequency corresponding to the frequency controlled by said frequency control circuit, and wherein said determination circuit determines that said transformer circuit becomes unusual when a difference between the target speed and the speed of the motor is not reduced even by increasing or decreasing the frequency by said frequency control circuit.

6. A drive control device of a vibration type motor in which a periodic voltage is applied to an electro-mechanical energy conversion element to vibrate a vibration member, thereby obtaining a driving force, comprising:

an encoder connected to the vibration type motor;

a feedback control system, said control system having a first comparator which compares an output from said encoder with target speed data, and a feedback circuit which increases or decreases a driving frequency in accordance with an output from said comparator in order to shift a speed of the motor to the target speed;

a driving circuit connected to said feedback control system to generate a periodic voltage having a frequency corresponding to the frequency determined by said feedback control system;

a second comparator which compares a frequency determined by said feedback control system with a limit value, and when the frequency reaches the limit value, outputting a signal representing that the frequency has reached the limit value; and a stop circuit connected to said second comparator to stop operating said driving circuit.

7. A device according to claim 6, wherein said driving circuit comprises a pulse generation circuit which generates a pulse having a frequency corresponding to the frequency determined by said feedback control system, and a transformer circuit which generates the periodic voltage in accordance with the pulse, and wherein said stop circuit stops energizing said transformer circuit.

8. A device according to claim 6, wherein said driving circuit comprises a pulse generation circuit which generates a pulse having a frequency corresponding to the frequency determined by said feedback control system, and a transformer circuit which generates the periodic voltage in accordance with the pulse, and wherein said stop circuit stops the generating of a pulse by said pulse generation circuit.

9. A drive control device of a vibration type motor in which a periodic voltage is applied to an electro-mechanical energy conversion element to vibrate a vibration member, thereby obtaining a driving force, comprising:

a monitor circuit which monitors information about the rotational speed of the vibration type motor;

a frequency control circuit which compares the information about the rotational speed monitored by said monitor circuit with information about a target speed, and increases or decreases a driving frequency in order to shift the speed of the motor to the target speed;

a driving circuit which generates a periodic voltage having a frequency corresponding to the frequency controlled by said frequency control circuit;

a comparator which compares the frequency controlled by said frequency control circuit with a limit value, and when the frequency reaches the limit value, outputs a signal representing that the frequency has reached the limit value; and a stop circuit which stops operating said driving circuit in response to the signal from said comparator.

10. A device according to claim 9, wherein said driving circuit comprises a pulse generation circuit which generates a pulse having a frequency corresponding to the frequency controlled by said frequency control circuit, and a transformer circuit which generates the periodic voltage in accordance with the pulse, and wherein said stop circuit stops energizing said transformer circuit.

11. A device according to claim 9, wherein said driving circuit comprises a pulse generation circuit which generates a pulse having a frequency corresponding to the frequency controlled by said frequency control circuit, and a transformer circuit which generates the periodic voltage in accordance with the pulse, and wherein said stop circuit stops the generating of a pulse by said pulse generation circuit.

12. A printer apparatus having a drive control device of a vibration type motor in which a periodic voltage is applied to an electro-mechanical energy conversion element to vibrate a vibration member, thereby obtaining a driving force, comprising:

a monitor circuit which monitors information about the rotational speed of the vibration type motor;

a frequency control circuit which compares the information about the rotational speed monitored by said monitor circuit with information about a target speed, and increases or decreases a driving frequency in order to shift the speed of the motor to the target speed;

a driving circuit which generates a periodic voltage having a frequency corresponding to the frequency controlled by said frequency control circuit; and a stop circuit which stops operating said driving circuit when the difference between the target speed and the speed of the motor is not reduced even by increasing or decreasing the frequency by said frequency control circuit.

13. An apparatus according to claim 12, further comprising announcement means for, when the difference between the target speed and the speed of the motor is not reduced even by increasing or decreasing the frequency by said frequency control circuit, announcing that the difference between the target speed and the speed of the motor is not reduced even by increasing or decreasing the frequency by said frequency control circuit.

14. An apparatus according to claim 12, wherein said driving circuit comprises a pulse generation circuit which generates a pulse having a frequency corresponding to the frequency controlled by said frequency control circuit, and a transformer circuit which generates the periodic voltage in accordance with the pulse, and wherein said stop circuit stops energizing said transformer circuit.

15. An apparatus according to claim 12, wherein said driving circuit comprises a pulse generation circuit which generates a pulse having a frequency corresponding to the frequency controlled by said control circuit, and a transformer circuit which generates the periodic voltage in accordance with the pulse, and wherein said stop circuit stops the generating of a pulse by said pulse generation circuit.

16. A printer apparatus having a drive control device of a vibration type motor in which a periodic voltage is applied to an electro-mechanical energy conversion element to vibrate a vibration member, thereby obtaining a driving force, comprising:

a transformer circuit including a transformer which generates the periodic voltage as an output from a secondary side thereof;

a determination circuit which determines whether said transformer circuit becomes unusual; and a stop circuit which stops driving the motor when said determination circuit determines that said transformer circuit becomes unusual, wherein said drive control device comprises a monitor circuit which monitors information about the rotational speed of the vibration type motor, a frequency control circuit which compares the information about the rotational speed monitored by said monitor circuit with information about a target speed, and increases or decreases a driving frequency in order to shift the speed of the motor to the target speed, and a driving circuit which drives said transformer circuit by a frequency corresponding to the frequency controlled by said frequency control circuit, and wherein said determination circuit determines that said transformer becomes unusual when the difference between the target speed and the speed of the motor is not reduced even by increasing or decreasing the frequency by said frequency control circuit.

* * * * *

UNITED STATES PATENT AND TRADEMARK OFFICE
CERTIFICATE OF CORRECTION

PATENT NO. : 6,333,609 B1
DATED : December 25, 2001
INVENTOR(S) : Tetsuro Fukusaka et al.

It is certified that error appears in the above-identified patent and that said Letters Patent is hereby corrected as shown below:

Column 1,
Line 15, "electrome-" should read -- electro-me- --.
Line 28, "drive" should read -- the driving --.

Column 4,
Line 16, "dis-" should read -- is dis- --.
Line 17, "is" (1st occurrence) should be deleted.

Signed and Sealed this

Twenty-eighth Day of January, 2003

JAMES E. ROGAN
*Director of the United States Patent and Trademark Office*